S. D. WACKMAN.
Axle.
No. 79,165.                                      Patented June 23, 1868.
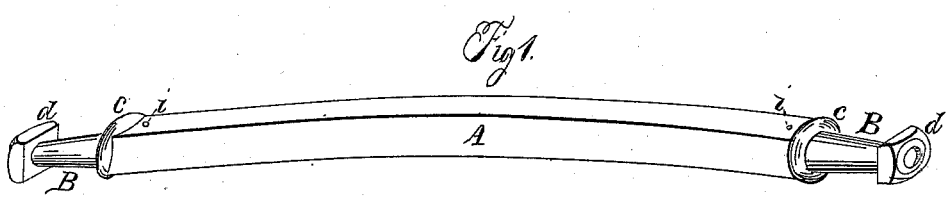
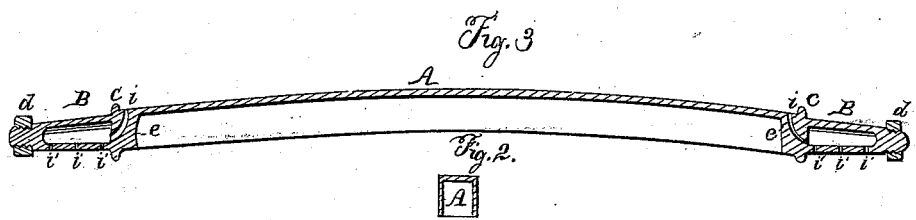

United States Patent Office.

SMITH D. WACKMAN, OF AUBURN, NEW YORK.

Letters Patent No. 79,165, dated June 23, 1868.

IMPROVEMENT IN AXLES FOR VEHICLES.

*The Schedule referred to in these Letters Patent and making part of the same.*

TO ALL WHOM IT MAY CONCERN:

Be it known that I, SMITH D. WACKMAN, of Auburn, in the county of Cayuga, and State of New York, have invented an Improved Axle for Vehicles, of which the following is a full, clear, and exact description, reference being had to the accompanying drawings, which make part of this specification, and in which—

Figure 1 represents a view in perspective of my improved axle,

Figure 2 a vertical transverse section, and

Figure 3 a vertical longitudinal section through the same.

It is the object of my invention to secure a strong, light, and effective axle, to which end my improvements consist—

First, in a novel method of constructing axles for vehicles of a single plate ot metal bent into a trough-shape.

Second, in a novel method of combining, with a trough-shaped axle, tubular bearings, formed by rounding the ends of the axle.

In order to carry out my invention, I take a plate or bar of metal, steel by preference, and bend it in any proper well-known way into a trough-shaped axle, A, arched in the middle, as shown in the drawings, and with its open side underneath.

The bearings B for the wheels are formed on each end by bending the ends of the trough into a tube, and welding or soldering them together. Suitable collars $c$ and nuts $d$ are secured on the axle in the usual way.

Blocks $e$ may be inserted in the ends of the trough to secure additional stiffness, and oil-ducts $i\ i'$ may be provided for the lubrication of the axle.

It is obvious that the axle may be pressed into forms of varying outline, without departing from the spirit of my invention, such, for instance, as the form of an ordinary carriage-axle.

What I claim as my invention, and desire to secure by Letters Patent, is—

1. A trough-shaped axle for vehicles, substantially as set forth.

2. The combination, substantially as set forth, with a trough-shaped axle, of tubular bearings.

In testimony whereof, I have hereunto subscribed my name.

S. D. WACKMAN.

Witnesses:
 J. F. M. DAVIE,
 F. J. SEARLS.